(12) United States Patent
Kalinowski et al.

(10) Patent No.: US 7,411,162 B2
(45) Date of Patent: Aug. 12, 2008

(54) HOT WIRE CONTROL APPARATUS AND METHOD

(75) Inventors: Michael A. Kalinowski, Merrimack, NH (US); Mitchell W. Smith, Newton, NH (US); Russell T. Christman, Dunstable, MA (US); James L. Michaelian, Palmer, MA (US)

(73) Assignee: Shanklin Corporation, Ayer, MA (US)

( * ) Notice: Subject to any disclaimer, the term of this patent is extended or adjusted under 35 U.S.C. 154(b) by 15 days.

(21) Appl. No.: 11/645,375

(22) Filed: Dec. 26, 2006

(65) Prior Publication Data

US 2007/0194006 A1 Aug. 23, 2007

Related U.S. Application Data

(60) Provisional application No. 60/754,052, filed on Dec. 27, 2005.

(51) Int. Cl.
*H05B 1/02* (2006.01)
(52) U.S. Cl. ............... 219/486; 219/494; 219/497; 219/492; 53/375.9; 156/583.2
(58) Field of Classification Search ............... 219/243, 219/492, 497, 499, 494, 501, 507, 508; 158/581.2, 158/581.1; 53/375.9
See application file for complete search history.

(56) References Cited

U.S. PATENT DOCUMENTS

| 1,671,300 | A | 5/1928 | MacDonald et al. ......... 219/388 |
|---|---|---|---|
| 3,283,126 | A | 11/1966 | Velyel ......................... 219/243 |
| 3,569,667 | A | 3/1971 | Ryswick ...................... 219/243 |
| 3,721,801 | A | 3/1973 | Bate ............................ 219/243 |
| 3,746,838 | A | 7/1973 | Drugmand ................... 219/512 |
| 3,840,722 | A | 10/1974 | Mayer et al. ................. 219/243 |
| 3,883,720 | A | 5/1975 | Snider ......................... 219/535 |
| 3,965,333 | A | 6/1976 | Elsner et al. ................. 219/243 |
| 3,976,196 | A | 8/1976 | Mueller ....................... 206/526 |
| 3,989,926 | A | 11/1976 | Yoshizawa et al. ........... 219/216 |
| 4,288,271 | A | 9/1981 | Campbell, Jr. et al. ....... 156/359 |
| 4,377,738 | A | 3/1983 | Berg ........................... 219/490 |
| 4,856,260 | A | 8/1989 | Woo et al. ..................... 53/373 |
| 4,964,944 | A | 10/1990 | Christine et al. ............. 156/515 |
| 5,321,230 | A | 6/1994 | Shanklin et al. .............. 219/492 |
| 5,597,499 | A | 1/1997 | Dunn .......................... 219/243 |
| 5,603,801 | A | 2/1997 | DeFriese et al. ............. 156/515 |
| 5,791,125 | A | 8/1998 | Kallner ......................... 53/477 |
| 6,822,203 | B2 | 11/2004 | Hayward ..................... 219/512 |
| 7,075,035 | B2 * | 7/2006 | Kalinowski .................. 219/241 |

FOREIGN PATENT DOCUMENTS

| FR | 1 136 990 | 5/1957 |
|---|---|---|
| GB | 901 574 | 7/1962 |

* cited by examiner

*Primary Examiner*—Mark Paschall
(74) *Attorney, Agent, or Firm*—Nields & Lemack

(57) ABSTRACT

Control system and apparatus for controlling current input to an electrical resistance element such as a seal wire. The system and apparatus of the present invention is a closed loop feedback modification to conventional systems, and takes advantage of the inherent expansion of the seal wire as it is heated. The feedback mechanism monitors both the actual current passing through the wire, and the length of the sealing wire, and adjusts the current applied to the wire, responsive to those monitored inputs. The usage of the sealing machine is also monitored and the application and amount of current flowing to the wire is varied based on this usage.

11 Claims, 7 Drawing Sheets

DETAIL C
SCALE 1:2

HOT WIRE CONTROL APPARATUS AND METHOD

This application claims priority of U.S. Provisional Application Ser. No. 60/754,052 filed Dec. 27, 2005, the disclosure of which is incorporated herein by reference.

BACKGROUND OF THE INVENTION

Packaging machines for wrapping and sealing plastic film about an article conventionally utilize a heated wire to seal film layers to one another and to melt through the layers in order to separate one article from another as the articles pass through the machine. Current is to a high temperature in order to effect the seal and cutting operation. The appearance of the resulting seal is fine and neat as the film shrinks tightly around the package, especially where polypropylene films are involved. Such hot wires are typically used to form both end seals and side seals.

As the wire contacts the film and performs its intended function, it loses heat to the film as well as to the surrounding environment. Accordingly, current must be continually or continuously supplied to the wire in order to maintain the appropriate wire temperature.

Typically the wire is a resistive element approximately 45-50 thousandths of an inch in diameter, therefore making it susceptible to temperature build-up, fatigue and failure. Thus, if the current to the wire is not properly controlled and the wire temperature becomes too high, the wire tends to break. For example, as machine speed increases, the current impulse sent to the seal wire to heat the wire to the appropriate temperature becomes more and more frequent, until such point that the seal system is, in effect, on at all times. The wire becomes more susceptible to failure as the film being sealed is not drawing away the excess heat (acting as a heat sink) as fast as the heat is being applied to the wire. The wire eventually softens, stretches, and breaks. This is a common occurrence particularly when proper operator attention is absent. Changing the wire requires that the machine be shut down, resulting in considerable loss of productivity.

U.S. Pat. No. 5,597,499 addresses this problem by providing a seal wire control system that controls the duration of heat impulses applied to the sealing wire. It utilizes an open loop configuration that regulates the heat applied to the seal wire based on the number of articles and the frequency that the articles are run through the wrapper. However, the versatility of this solution is limited.

U.S. Pat. No. 6,822,203, which is hereby incorporated by reference, addresses this problem by monitoring the expansion of the sealing wire. It utilizes a closed loop configuration that regulates the current applied to the wire based on the length of the wire. When the wire expands to a certain threshold length, the current applied to the seal wire is reduced or eliminated. After the wire has sufficiently cooled so as to contract to a length less than the threshold, the current applied is restored. This represents an improvement over the prior configurations, but still requires adjustments when the cycle rate of the packaging machine is adjusted. If these adjustments are not made, the sealing wire will last longer than one controlled by an open loop configuration, but may still fail prematurely due to fatigue.

It would be desirable to provide a seal system that is a closed loop feedback configuration that detects the expansion and contraction of the wire, and adjusts the current so as to regulate the length of the wire in order to protect it from fatigue and failure. Furthermore, it would be desirable to vary the application and amount of current applied to the wire based on its usage.

These and other objects will be made apparent by reference to the following description and drawings.

SUMMARY OF THE INVENTION

The problems of the prior art have been overcome by the present invention, which provides a control system and apparatus for controlling and monitoring the current input to an electrical resistance element such as a seal wire. The system and apparatus of the present invention is a closed loop feedback modification to conventional systems, and takes advantage of the inherent expansion of the seal wire as it is heated. The feedback mechanism monitors both the actual current passing through the wire, and the length of the sealing wire, and adjusts the current applied to the wire, responsive to those monitored inputs. The present invention also monitors the usage of the sealing machine and varies the application and amount of current flowing to the wire based on this usage.

Using these techniques, wire stress and fatigue are reduced, allowing greater wire life.

DETAILED DESCRIPTION OF THE INVENTION

Figure 1:
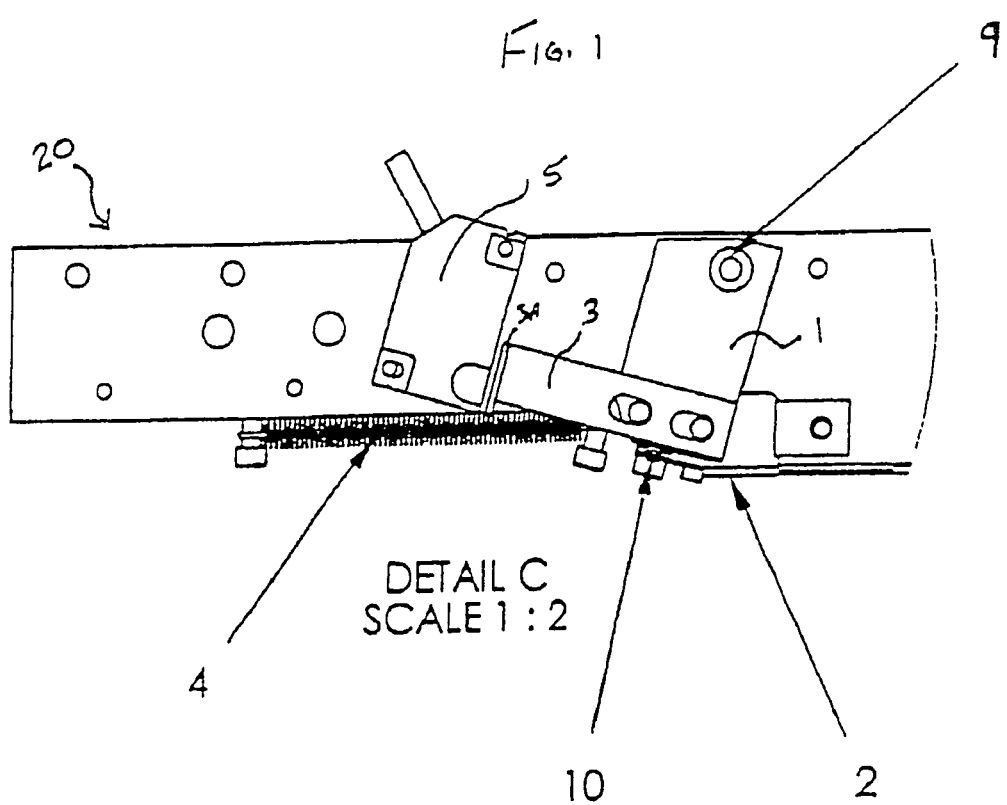
FIG. 1 is a partial front view of an end seal assembly in accordance with the present invention.

Turning now to the figures, there is shown a portion of an end seal assembly for a packaging machine in accordance with one embodiment of the present invention. It should be understood that the end seal assembly is shown by way of illustration, as the present invention is not limited to any particular location of the sealing mechanism. Top jaw 20 is shown (FIG. 1), which is conventionally sandwiched by a pair of opposite film clamps coupled via a film guard mount (not shown), the mount being coupled, in turn, to the top jaw 20. One end of an electrical impulse element such as a seal wire 2 is fixed to the underside of the top jaw 20 with a wire tension block (not shown). The opposite moving or floating end of seal wire 2 is coupled to a seal wire pivot member 1 at wire terminal 10. A pivot member 1 is pivotally mounted on the top jaw 20 at pivot point 9 so that it moves in response to expansion and contraction of the seal wire 2, depending upon the seal wire temperature. A detector actuator 3 is mounted to the seal wire pivot plate or block 1, and extends beyond the pivot member 1 towards detector 5 as shown. Preferably the actuator 3 terminates in a flange portion 3A to provide sufficient surface area to actuate proximity detector 5 as discussed in greater detail below. One end of biasing member 4, such as a coil spring, is fixed to the actuator 3 and the opposite end of the biasing member 4 is fixed to the top jaw 20 so as to maintain the actuator 3 (and pivot member 1) under tension, and bias the actuator and thus the seal wire 2 in a direction away from wire tension block 8.

Figure 4:
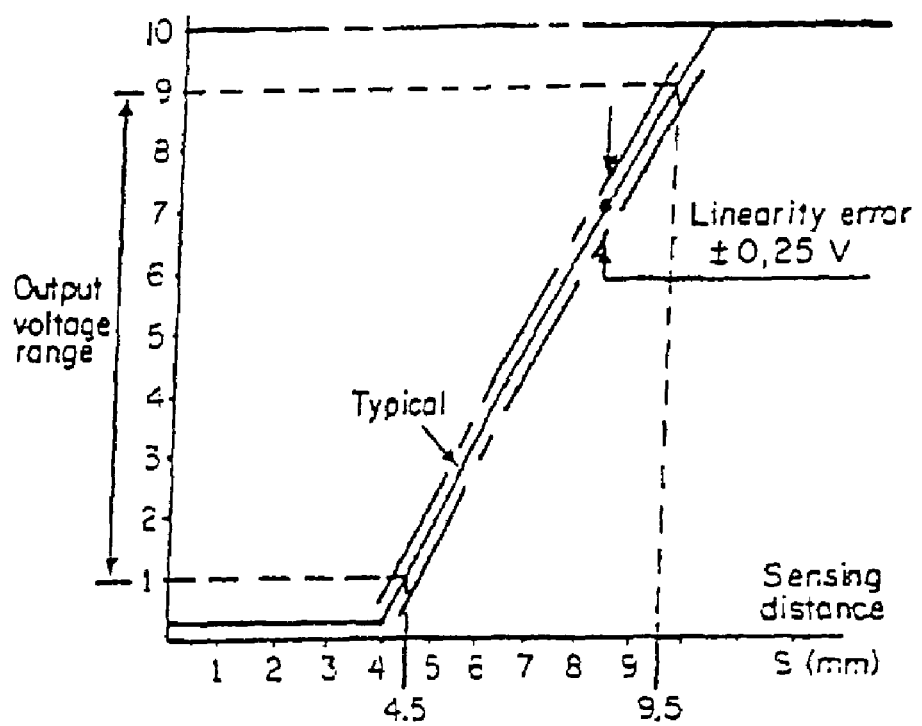
FIG. 4 is a graph illustrating the output of a representative proximity sensor in accordance with the present invention.

Spaced a set distance from the actuator 3 is a detector 5, such as a proximity sensor. Other detectors, such as optical detectors, capable of monitoring the expansion and contraction of seal wire 2 are suitable and within the scope of the present invention. As current is applied to the seal wire 2 and the seal wire 2 heats up and expands, the expansion is accommodated by the pull force of the biasing member 4 and the pivoting action of the pivot member 1. As a result, the pivot member 1 pivots in a clockwise direction from the position shown in FIG. 2 to the position as viewed in FIG. 1, driving actuator 3 towards the sensor of the detector 5. The detector 5 senses the distance between itself and actuator 3 and generates an output responsive to that distance. In the preferred embodiment, a response linearly proportional to the distance between the detector 5 and the actuator 3 is produced, as illustrated in FIG. 4. Based on that output, the current applied to the seal wire 2 is varied in an attempt to maintain a roughly uniform wire length. Thus, when the output of detector 5 indicates that actuator 3 is closer than desired (and therefore too hot), the amount of current applied to seal wire 2 is reduced. Now with a reduced application of current, the seal wire 2 cools and contracts, and the pivot member 1 and actuator 3 are pulled in a counter-clockwise direction as viewed in FIG. 2. This increases the distance between the detector 5 and the actuator 3, which in turns increases the output from the detector 5. Conversely, when the output of detector 5 indicates that actuator 3 is further away than desired (and therefore too cool), the amount of current applied is increased, thereby heating the seal wire 2. Now with an increased application of current, the seal wire 2 heats and expands, and the pivot member 1 and actuator 3 are pulled in a clockwise direction as viewed in FIG. 1. This decreases the distance between the detector 5 and the actuator 3, which in turns decreases the output from the detector 5.

Figure 3:
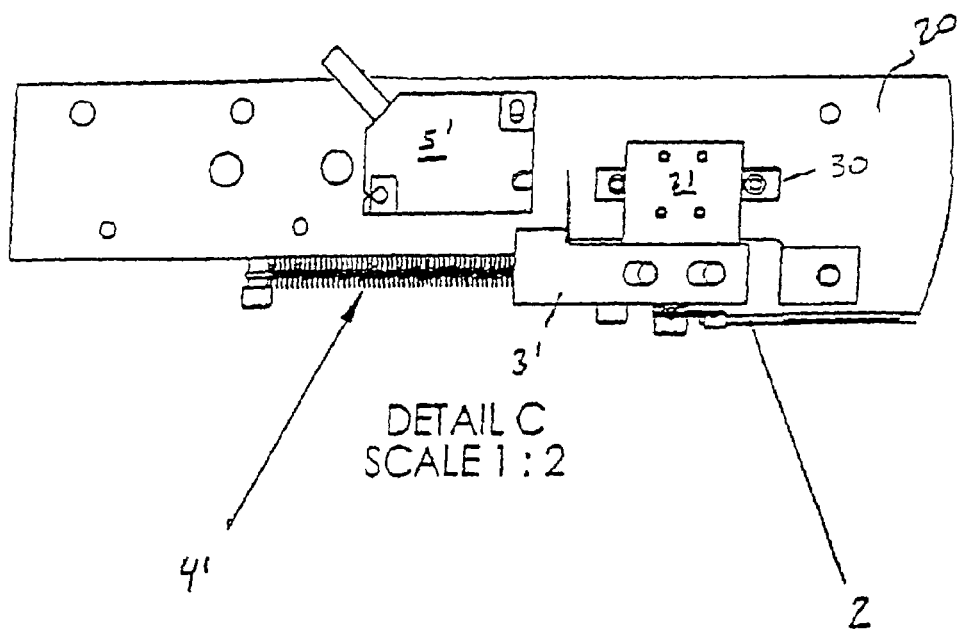
FIG. 3 is a partial front view of an end seal assembly in accordance with another embodiment of the present invention.

Other means of determining the length of the seal wire 2 can be used and are within the scope of the present invention. For example, rather than utilizing a pivoting pivot member 1, as in FIG. 1, a linear system, illustrated in FIG. 3, could be used. FIG. 3 shows an embodiment where the actuator moves linearly rather than pivoting. Linear guiderail 30 supporting block 31 is coupled to top jaw 20. In this embodiment, proximity switch 5' is placed so as to be able to sense the movement of actuator 3'. Thus, when actuator 3' is in the position shown in FIG. 3, the seal wire 2 has not yet expanded. Biasing member 4', such as a compression or extension spring, is attached to a wire tension block (to which the actuator 3' is also connected) and holds the seal wire 2 in tension as before. As the wire 2 heats up and expands, the actuator 3' travels linearly (to the left in FIG. 3) toward the detector 5'. This causes a reduction in the output of the proximity sensor, which in turn lowers the current applied to seal wire 2. As seal wire 2 cools, it contracts, the actuator 3' travels linearly (to the right in FIG. 3) away from detector 5'. This causes an increase in the output of proximity sensor, which in turn increases the current applied to seal wire 2.

Figure 2:
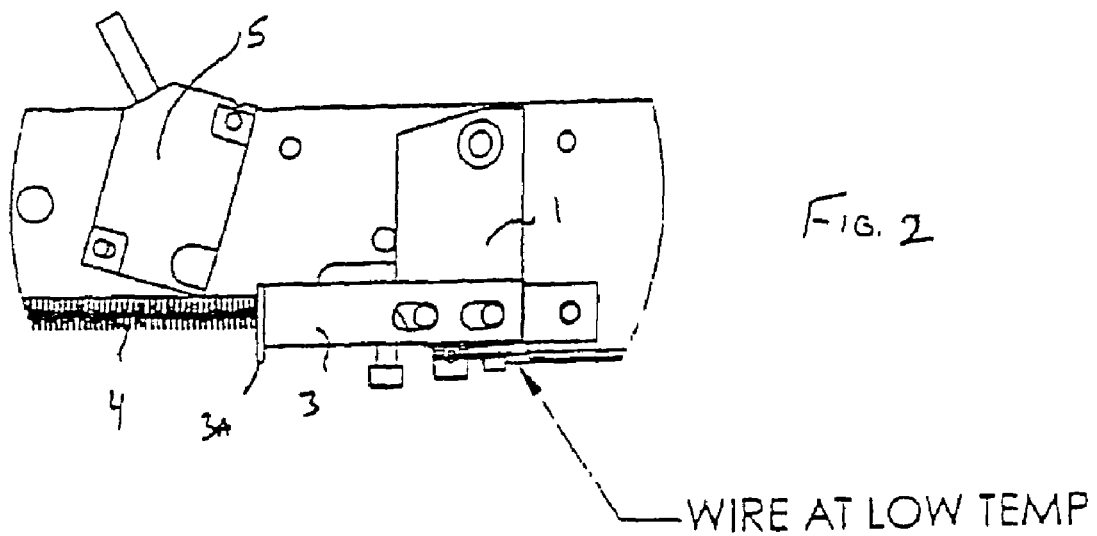
FIG. 2 is a partial front view of an end seal assembly with the seal wire at low temperature in accordance with the present invention.

In another embodiment, instead of a proximity sensor, a potentiometer is used. In this embodiment, the potentiometer generates an output based on rotational movement. The potentiometer is placed at pivot point 9 (FIG. 1). As the length of the seal wire 2 changes, pivot member 1 rotates about pivot point 9. Therefore, the length of seal wire 2 can be determined based on the angle of rotation of pivot member 1. The rotational movement of pivot member 1 caused a corresponding change in output from the potentiometer. This output can then be used in the same manner as the output of the proximity sensor, as will be described later. Those skilled in the art will appreciate that other methods of measuring the length of the seal wire are also possible, and this description is not meant to limit the invention to only these embodiments.

Also in close proximity to the seal wire is a current sensor. This sensor can be in series with the seal wire, such as a current transformer. This sensor creates an output that is preferably proportional to the current flowing in the seal wire. This output is preferably analog, although a digital output is within the scope of the invention.

The system preferably also includes a programmable logic controller (PLC) or another device capable of performing arithmetic and algorithmic functions. There are a number of commercially available PLC's that can be used. In the alternative, a device can be customized for this application.

Having described the preferred physical embodiment of the seal wire and associated mechanisms, the control of the current will now be detailed.

Figure 5:
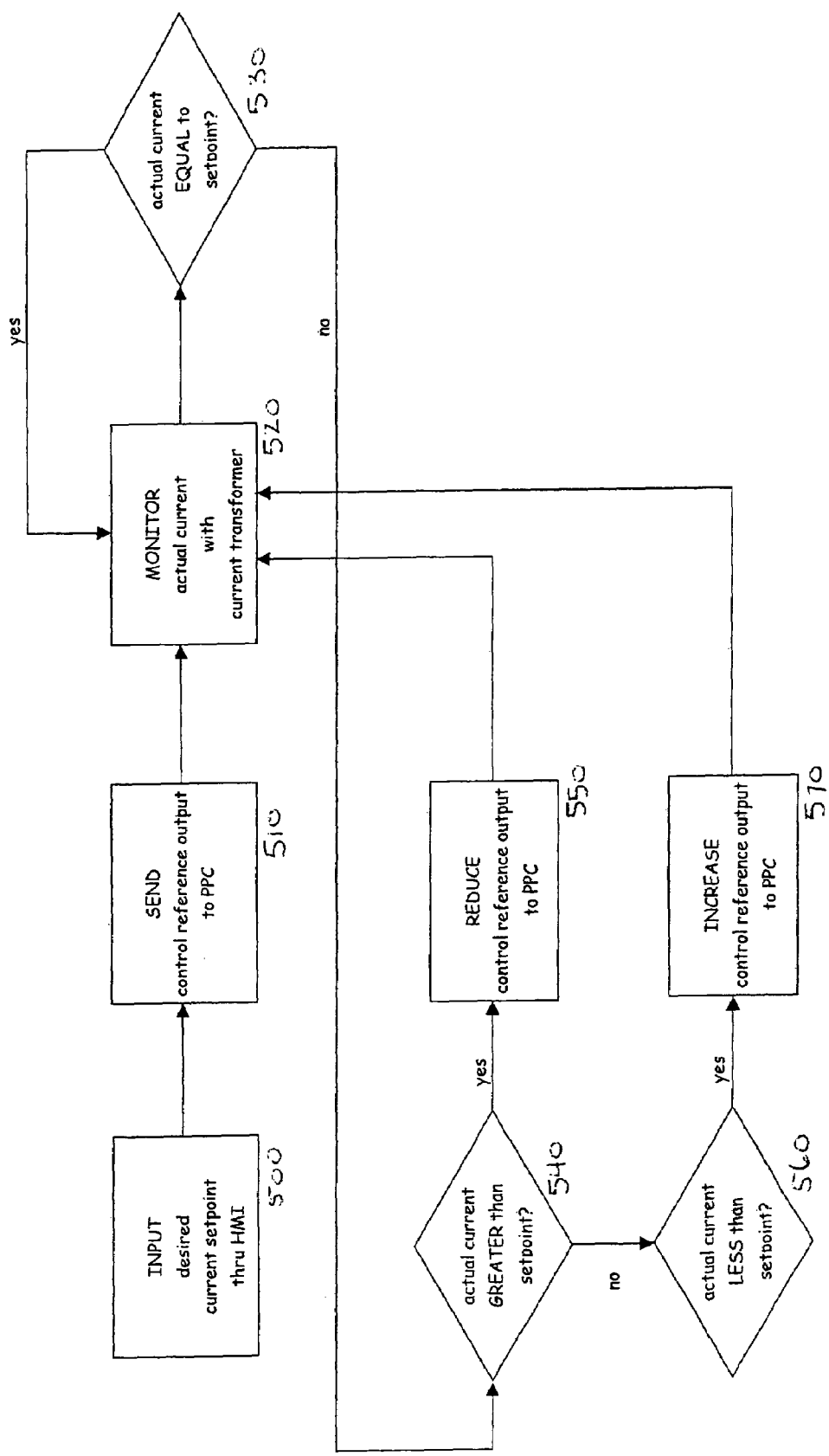
FIG. 5 is a flowchart illustrating a first embodiment of the current control.

FIG. 5 shows a flowchart which can be employed to closely control the current through the seal wire. In Box 500, the desired set point is input, preferably via a human/machine interface, such as a touch screen, keypad or knob. This set point, which is preferably input in amps, preferably in the range of 0 to 40, is preferably first converted to a digital value. In the preferred embodiment, a value of 0 Amps corresponds to a digital value of 0, while a value of 40 Amps equates to a digital value of 32767.

In Box 510, this digital number is then converted to an analog value. In one embodiment, the analog value is created using a Digital to Analog Converter (DAC), having an output range of between 0 and 10V. This analog voltage, which is output from the PLC, then serves as the input to a Power Proportional Controller (PPC), which converts this analog voltage into the current to be supplied to the sealing element. In a second embodiment, this digital value is directly converted to an analog current. This current can be the desired sealing current, or can be input to a current transformer to adjust its range.

The desired current, as determined by the set point, is then compared to the actual current in the seal wire, as measured by the current sensor in Decision Box 530. In one embodiment, the current transformer is used to scale the sealing current to a level which is more appropriate for use with the PLC. For example, while the sealing current may be as large as 40 Amps, the preferred range of the current received from the current transformer is in the range of milliamps, preferably less than 50, most preferably between 4 and 20 milliamps. This current is then converted at a digital value, also preferably in the value from 0 to 32767. If this measured current matches the desired current set point, the current supplied to the wire is unchanged (i.e. the reference output is unaltered) and the system returns to Box 520 and continues to monitor the measured current. In the preferred embodiment, the current is constantly monitored and the reference output is adjusted every 5 to 10 milliseconds.

If the measured current differs from the desired current, the system tests whether the actual current is greater or less than the desired value, in Decision Boxes 540 and 560. If the actual current is greater than the set point, then the current flowing to the seal wire must be reduced. This is accomplished by reducing the reference output (Box 550). If the actual current is less than the set point, then the current must be increased. This is accomplished by increasing the reference output (Box 570).

The determination of how the difference between the measured current and the desired set point affects the newly generated reference output is implementation specific. For example, a control loop utilizing any or all of the following: integral, derivative and proportional, can be employed. However, in the preferred embodiment, a simple proportional control loop is used. The determination and magnitude of the correction to be applied is also implementation dependent. For example, in one embodiment, the digital representation of the measured current is subtracted from the digital representation of the set point. This value is then subtracted from the reference output (if the measured current is less than the desired set point, this difference would be added to the reference output). In a second embodiment, the magnitude of the difference is not used. Rather, only the polarity of the difference is used. Thus, a positive difference between the digital representation of the measured current and the set point causes a fixed value to be subtracted from the reference output. Conversely, a negative difference causes a fixed value to be added to the reference output. In one embodiment, this fixed value is a value of 2, although other values can be used as well. This method, while perhaps taking longer to reach the desired value, does not have issues such as overshoot. By using a simple proportional control loop, the processing power and memory requirements of the PLC can be greatly reduced. This method also serves to reduce the complexity and cost of the system, since more complex PID controllers are not necessary.

Figure 6:
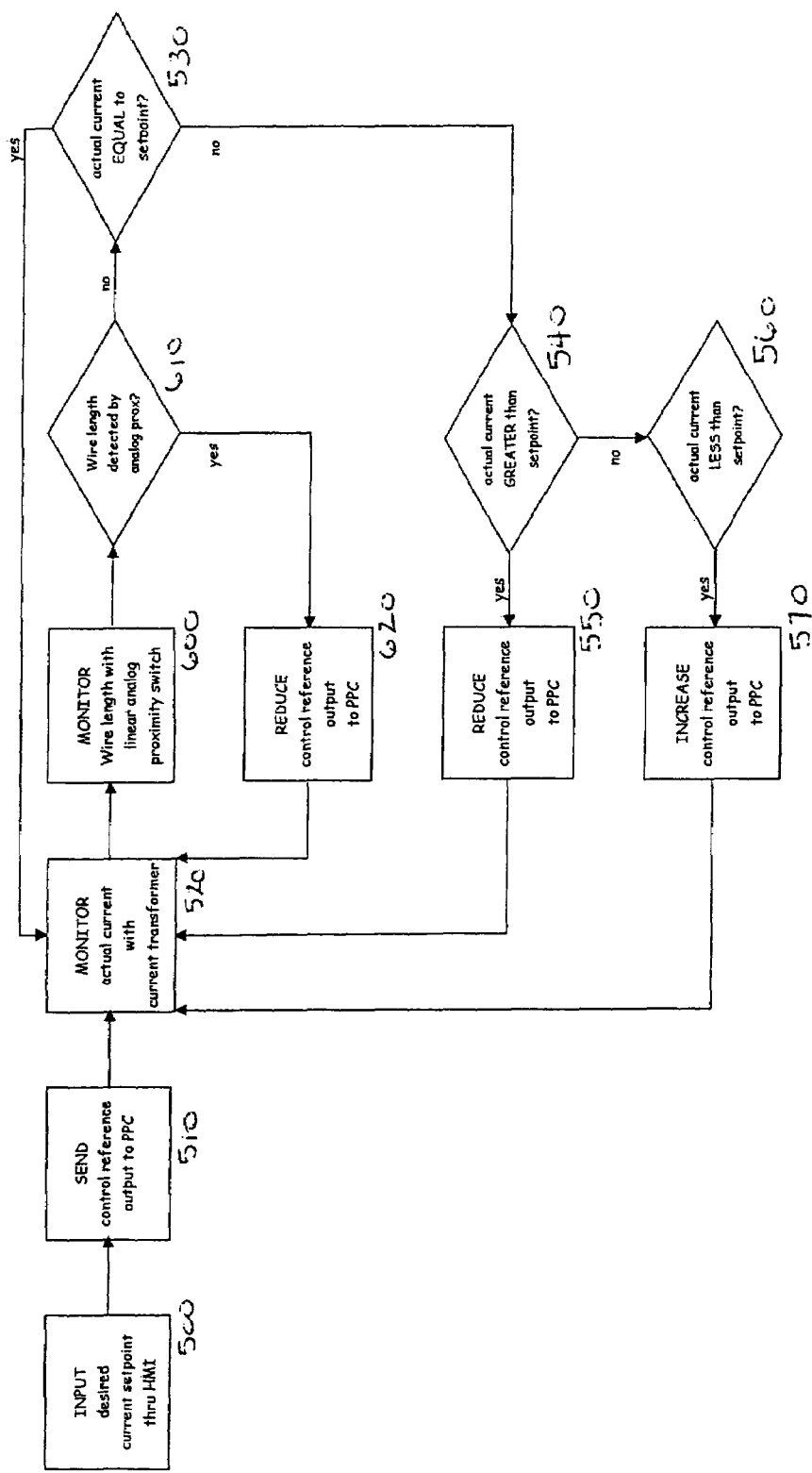
FIG. 6 is a flowchart illustrating a second embodiment of the current control.

FIG. 6 shows an enhancement to the flowchart of FIG. 5. Those boxes having an equivalent function as the previous flowchart are given the same reference designators. In this modified flowchart, additional provisions have been added to monitor and compensate for increased wire length, which is typically caused by excessive heat. As before, the system attempts to maintain the measured current equal to the desired set point. However, in this embodiment, the wire length is also monitored, such as by using a proximity sensor described earlier.

In one embodiment, the output of the proximity sensor is an analog voltage, typically in the range from 0 to 10V. This analog output is then converted to a digital value, preferably between 0 and 32767 by an analog to digital converter (ADC). If this value is zero, the wire has not expanded to the point at which it is visible to the proximity sensor. Greater values indicate that the wire is expanding. This value is monitored in Box 600.

If the wire has begun to stretch, as monitored in Box 600, the system will reduce the amount of current flowing through the seal wire to counteract this effect. This reduction is irrespective of the desired current set point. Thus, if wire expansion is detected in Decision Box 610, the algorithm will forego the typical current monitoring and simply reduce the reference output. Thus, Boxes 600, 610 and 620 serve as an override of the normal current control, and are only operative if the wire has begun to stretch excessively. This reduction in current serves to cool the seal wire, allowing it to contract. Once the wire has returned to a more appropriate length, the system returns to its normal operation. In one embodiment, the digital representation of the proximity sensor reading is simply subtracted from the reference output, thereby decreasing the current sufficiently to cool the wire. In this way, the decrease in current is directly related to the measured expansion of the wire. In another embodiment, a fixed amount is subtracted from the reference output if the proximity sensor reading is non-zero.

The introduction of this override mechanism allows the system to automatically adapt to changing usage models without operation intervention. For example, if the duty cycle of the machine is such that a specific current works satisfactorily, a decrease in that duty cycle may cause the wire to expand since there is no place to sink the additional heat. Using the algorithm described above, the system automatically detects this condition and decreases the reference output, which in turn reduces the current to the seal wire.

The present invention also incorporates current control based on system usage. In the preferred embodiment, there are three different operating modes. The first, also known as continuous mode, allows a smaller amount of current to continuously pass through the seal wire. This is most typically employed during idle times, to allow the seal wire to remain warm, without expanding to the point of fatigue. The second mode, or running mode, maintains a higher level of current, sufficient to properly cut and seal at the desired operating rate. The third, or impulse mode, is preferably employed when the duty cycle of the sealing system is lower than normal. In this mode, a smaller amount of current (such as that used during the continuous mode) is continuously supplied, but when the wire is to be used to seal, the current is increased to allow it to reach a temperature adequate to cut and seal (such as equal to or greater than the current used for the running mode). Following this activity, the current returns to the lower value.

In one embodiment, a motion detector or proximity sensor is placed near the belt of the sealing machine, such that it detects when an article is nearing the sealing mechanism. This indication allows the system to increase the current in the wire in preparation for the sealing operation. This increased current continues until the seal is completed, which can be detected based on time or on the movement of the belt. Although not required, it is preferable that the current used in Impulse Mode be greater than that used in Running Mode since there is a requirement to quickly heat the wire.

Figure 7:
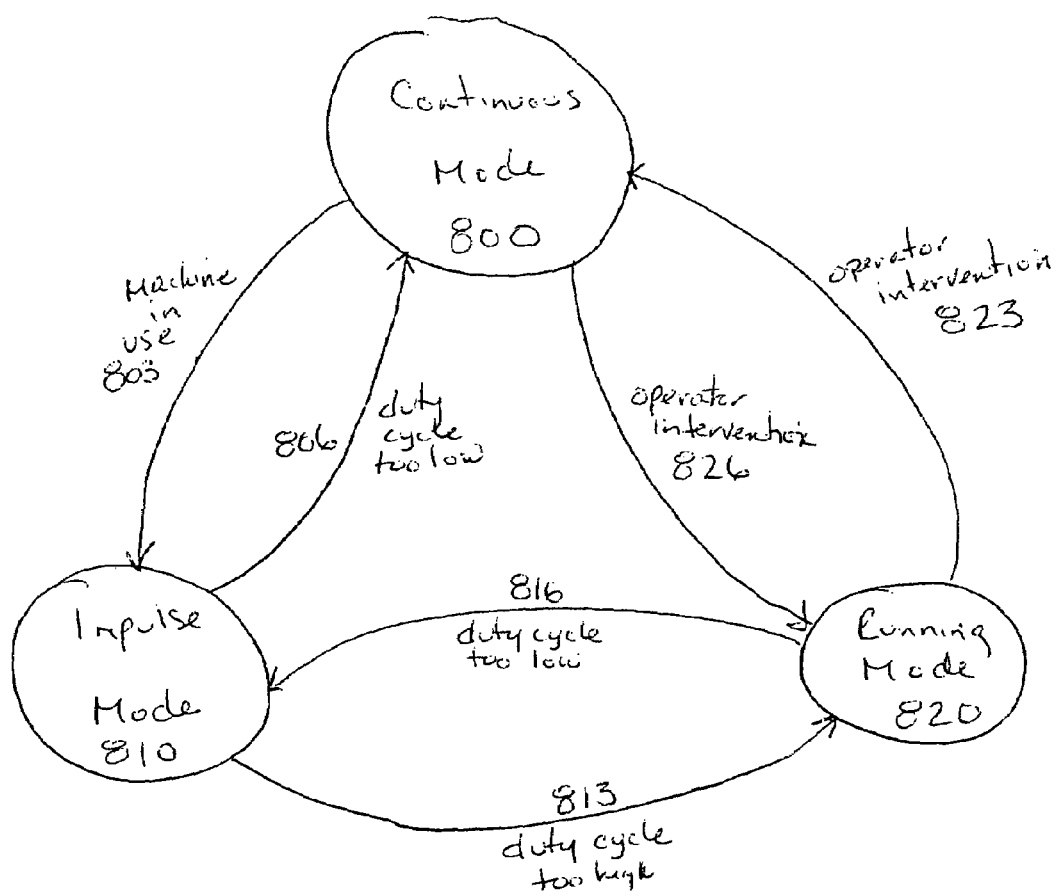
FIG. 7 is a flowchart illustrating current control based on machine usage.

FIG. 7 illustrates a flowchart showing the transitions between the various modes. While the machine is idle, the system remains in Continuous Mode 800. The system can automatically transition to the Impulse Mode 810 upon detection that the machine is to be used, as shown in 803. Impulse mode is preferably used only for low duty cycle activity. Therefore, as long as the duty cycle of the sealing machine remains low, the system will remain in Impulse Mode. If, however, the duty cycle increases, the system may transition to Running Mode 820, since there is less stress on the wire and the associated components in this scenario, as shown in 813. As long as the machine continues operating above a predetermined duty cycle, the system will remain in the Running Mode 820. Manual intervention by the operator can return the system from Running Mode 820 directly to Continuous Mode 800, as shown in 823. Similarly, manual intervention can be used to transition directly from Continuous Mode 800 to Running Mode 820, as shown in 826.

While in Running Mode 820, the system continues to monitor the duty cycle of the machine. If the duty cycle decreases below a predetermined level, the system will automatically transition back to Impulse Mode 810, as shown in 816.

Finally, while in Impulse Mode 810, the system will transition back to Continuous Mode if the frequency at which the machine is being used is too low, as shown in 806. By transitioning between these states automatically, the stress experienced by the seal wire and associated components due to expansion and contraction can be reduced.

This flowchart is intended to be illustrative of the types of conditions that may trigger a transition from one current state to another. However, it is not intended to be inclusive; other conditions, such as, but not limited to, the duration of time within a state, can also be used to trigger state transitions.

In the above example, there are at least two distinct current values that are used, a lower Continuous Mode current, and a larger Running Mode current. However, the invention is not so limited. As mentioned above, the Impulse Mode current need not be exactly the same as the Running Mode current and may preferably be greater.

In the preferred embodiment of the system, the control and monitoring of the various currents that are needed to implement the algorithm of FIG. 7 are performed using the algorithms illustrated in FIGS. 5 and 6, although this is not a requirement. Other methods of controlling the current, including those currently known in the art can be used with this algorithm.

Another element of the present invention used to increase the life of the sealing element is the use of annealed seal wires. The process of annealing subjects the wire to high temperatures and effectively tempers it. Having undergone this process, the wire is typically stronger and less susceptible to expansion at high currents and temperatures. Because of this, the wire is less prone to breakage, a common problem in the sealing industry. Furthermore, the improved ability to maintain its wire length also increases the wire's useful life. In practice, often, even if a wire does not break, over time it irreversibly expands. This expansion leads to slack, which affects the quality of the seal. By using annealed wire, the useful life of the wire can be extended, since irreversible expansion is less pronounced.

What is claimed is:

1. A method for controlling the temperature of an electrical resistance heating element within a sealing machine, comprising:
    applying current to said element to heat said element in a first constant current mode in which a first amount of current is constantly supplied to said element;
    intermittently applying a second amount of current to heat said element in a second impulse mode; and
    applying current to said element to heat said element in a third running mode in which a third amount of current, greater than said first amount, is constantly supplied to said element.

2. The method of claim 1, wherein the heating element is employed to seal for a fraction of the total time, and wherein said fraction defines the duty cycle of the heating element, further comprising constantly applying said third amount of current when said duty cycle exceeds a predetermined value.

3. The method of claim 1, whereby said first constant current mode is used when said machine is idle.

4. The method of claim 1, wherein the heating element is employed to seal for a fraction of the total time, and wherein said fraction defines the duty cycle of the heating element, and whereby said second impulse mode is used when said duty cycle is less than a predetermined value.

5. The method of claim 1, wherein said machine comprises a detector for detecting when an article to be sealed is approaching said heating element, and said machine transitions from said first mode to said second impulse mode upon said detection.

6. The method of claim 1, wherein said machine comprises a detector for detecting when an article to be sealed is approaching said heating element, and said machine transitions to said third mode if the frequency of said detections exceeds a predetermined value.

7. An apparatus for controlling the temperature of an electrical resistance heating element within a sealing machine, comprising:
    a power source adapted to constantly supply a first amount of current to said element;
    a power source adapted to intermittently supply a second amount of current said element; and
    a power source adapted to constantly supply a third amount of current, greater than said first amount, to said element.

8. The apparatus of claim 7, wherein said apparatus further comprises a detector for detecting when an article to be sealed is approaching said heating element.

9. The apparatus of claim 8, wherein said apparatus constantly supplies said third amount of current if the frequency of said detections exceeds a predetermined value.

10. The apparatus of claim 8, wherein said apparatus constantly supplies said first amount of current if the frequency of said detections is less than a predetermined value.

11. The apparatus of claim 8, wherein said apparatus intermittently supplies said second amount of current if said detector detects an article is approaching said heating element and the frequency of said detections is less than a predetermined value.

* * * * *